(12) United States Patent
Adams et al.

(10) Patent No.: US 11,047,414 B2
(45) Date of Patent: Jun. 29, 2021

(54) METAL LASHING PLATES

(71) Applicants: Craig Davis Adams, Jacksonville, OR (US); Peter Rossi, Marriottsville, MD (US)

(72) Inventors: Craig Davis Adams, Jacksonville, OR (US); Peter Rossi, Marriottsville, MD (US)

(73) Assignees: Craig Davis Adams, Jacksonville, OR (US); Peter Rossi, Marriottsville, MD (US)

( * ) Notice: Subject to any disclaimer, the term of this patent is extended or adjusted under 35 U.S.C. 154(b) by 533 days.

(21) Appl. No.: 15/976,045

(22) Filed: May 10, 2018

(65) Prior Publication Data
US 2019/0345964 A1 Nov. 14, 2019

(51) Int. Cl.
*F16B 7/04* (2006.01)

(52) U.S. Cl.
CPC ........... *F16B 7/048* (2013.01); *Y10T 403/343* (2015.01)

(58) Field of Classification Search
CPC ..... E04H 12/22; E04H 12/2292; E04H 15/34; E04H 15/42; E04H 15/44; F16B 7/00; F16B 7/044; F16B 7/048; F16B 7/0493; F16B 9/00; F16B 9/02; F16B 9/07; F16B 9/09; F16B 33/035; F16B 37/008; F16B 37/091; F16L 3/00; F16L 3/08; F16L 5/00; Y10T 403/34; Y10T 403/341; Y10T 403/342; Y10T 403/343; Y10T 403/347; Y10T 403/49; Y10T 403/4628; Y10T 403/4966; Y10T 403/4974; Y10T 403/4694; Y10T 403/7073; Y10T 403/7152; Y10T 403/7171; Y10T 403/7194

USPC .................. 135/100; 248/164, 431; 285/194; 403/169, 170, 171, 172, 176, 240, 263, 403/274, 282, 283, 375, 393, 396, 400
See application file for complete search history.

(56) References Cited

U.S. PATENT DOCUMENTS

| 64,694 | A | * | 5/1867 | Olds | ........................ | A47B 3/02 |
| | | | | | | 248/164 |
| 664,976 | A | * | 1/1901 | Sheffy et al. | ........... | A47C 9/105 |
| | | | | | | 248/431 |
| 1,473,812 | A | * | 11/1923 | Clements | ............... | H02G 3/083 |
| | | | | | | 285/194 |
| 1,494,690 | A | * | 5/1924 | Ernest | .................... | H02G 3/083 |
| | | | | | | 285/194 |
| 1,801,026 | A | * | 4/1931 | Smith | ..................... | E04H 15/24 |
| | | | | | | 135/100 |

(Continued)

OTHER PUBLICATIONS

H.H. Windsor, The Boy Mechanic, Book 3, 1999; p. 158 "Tightening Lever for Tennis Nets"; & pp. 166 & 167 "How to Make a Pair of Trammels", Chicago Popular Mechanics Co., Chicago, USA.

*Primary Examiner* — Josh Skroupa

(57) ABSTRACT

A joint made from a lightweight, thin metal connector plate with one or more through holes or cutouts, containing multiple sharp edges. The sharp edges, within the through hole or cutout, upset and engage the outer layers of a stick or sticks, or similarly essentially cylindrical and irregular members, when inserted into the connector plate and a force subsequently applied, by rotating or moving the stick or sticks off axis from the plate, to fasten the stick or sticks in place. The connector plate, being lightweight and compact is well suited to survival preparedness and outdoor activities.

12 Claims, 15 Drawing Sheets

(56) References Cited

U.S. PATENT DOCUMENTS

| | | | | |
|---|---|---|---|---|
| 2,275,058 A | * | 3/1942 | Draving | F16B 21/20 411/521 |
| 2,368,740 A | * | 2/1945 | Blomgren | A47C 9/04 248/164 |
| 2,663,306 A | * | 12/1953 | Davis | E04H 15/24 135/100 |
| 3,591,113 A | * | 7/1971 | Foster, Jr. | H01Q 1/1242 403/171 |
| 4,146,010 A | | 3/1979 | Manska | |
| 4,261,138 A | | 4/1981 | St. George Syms | |
| 4,318,652 A | | 3/1982 | Gore | |
| 4,326,354 A | | 4/1982 | Hagberg | |
| 4,371,281 A | * | 2/1983 | Magner | F16B 7/044 403/219 |
| 4,423,849 A | * | 1/1984 | Jordan | A47G 7/041 135/100 |
| 4,631,783 A | | 12/1986 | Hayashi | |
| 4,695,179 A | * | 9/1987 | Schnell | F16B 7/0493 403/24 |
| 4,717,108 A | * | 1/1988 | Liedle | H02G 1/00 248/164 |
| 4,734,003 A | | 3/1988 | Smith | |
| 4,856,221 A | | 8/1989 | Thompson | |
| 5,307,585 A | | 5/1994 | Thompson | |
| 5,556,146 A | | 9/1996 | Kirk | |
| 6,781,088 B2 | * | 8/2004 | Grubb | B23K 26/32 219/121.64 |
| 6,932,223 B1 | | 8/2005 | Lee | |
| 7,241,071 B2 | | 7/2007 | Carraher | |
| 7,766,687 B2 | | 8/2010 | Verjans | |
| D687,384 S | | 8/2013 | Kazakia | |
| 9,695,960 B2 | * | 7/2017 | Larsson | F16L 3/08 |
| 9,869,368 B2 | * | 1/2018 | Disantis | F16G 11/146 |
| 10,113,678 B2 | * | 10/2018 | Messana | F16L 37/0915 |
| 10,859,413 B2 | * | 12/2020 | Sellis | H02G 3/0691 |
| 2002/0110411 A1 | | 8/2002 | Chen | |
| 2005/0051695 A1 | | 3/2005 | Kovach | |
| 2010/0092236 A1 | | 4/2010 | Kang | |
| 2010/0108851 A1 | | 5/2010 | Jordan | |
| 2014/0212213 A1 | * | 7/2014 | Meyers | F16B 7/0433 403/396 |
| 2016/0295811 A1 | | 10/2016 | Rider | |
| 2017/0258072 A1 | | 9/2017 | Kay | |

\* cited by examiner

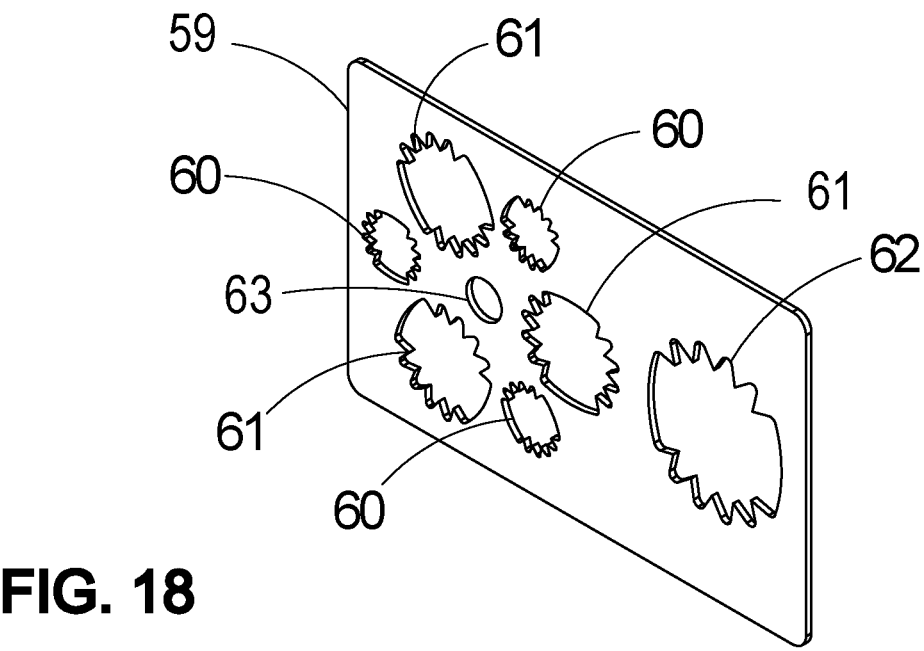
FIG. 18
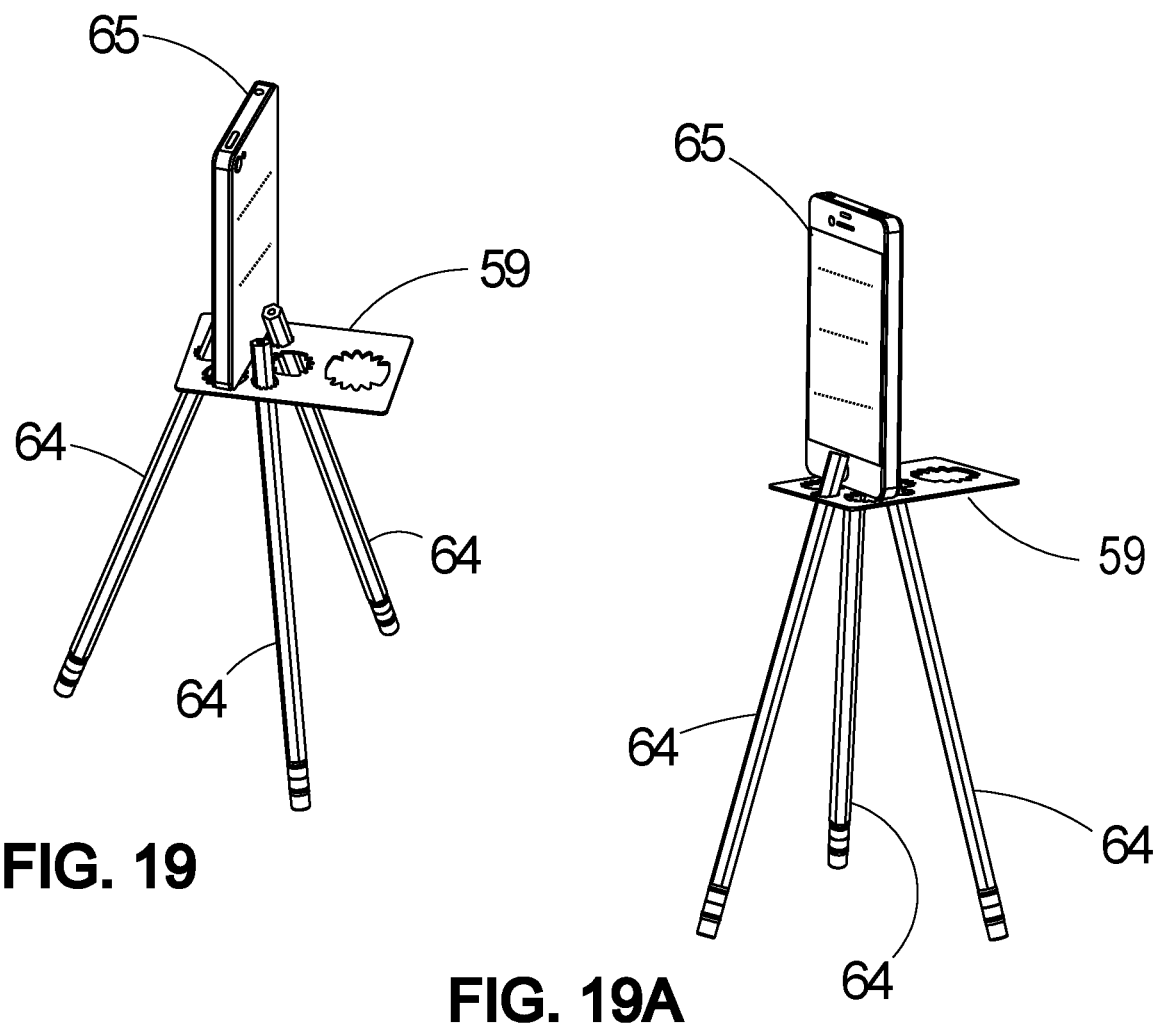
FIG. 19
FIG. 19A

METAL LASHING PLATES

TECHNICAL FIELD

The present invention relates to metal lashing plates for quickly and securely connecting natural members selected from a group consisting of wood sticks, tree branches, saplings, bamboo, and other canes, to quickly form a structure or tool by connecting the natural members, which can also be rapidly disassembled. The present invention uses hard, sharp edges within a single, or plurality of through holes and cutouts in a lightweight, thin plate to lock the natural members in place. The metal lashings of the present invention can also provide the means to attach flexible connectors selected from a group consisting of band, chain, cord, rope, straps, and wire, along with the means to be joined by solid connectors selected from a group of metal and plastic fasteners, rods, hooks, carabiners and other mountaineering hardware.

BACKGROUND ART

Outdoor pursuits like hiking, backpacking, camping, mountain biking, off-road ATV and dirt biking are rapidly growing recreational activities. Equally, there has been significant growth in the number of people preparing for survival in the case of man-made or natural disasters. Survival, whether it be due to a mishap while outdoors or a disaster situation, often requires structures and tools to be fabricated from locally available materials, commonly referred to as bushcraft. The more expediently and effectively those structures or tools can be made, especially under extreme conditions, increases the chance of survival. Even when it is not a life or death situation, the ability to construct useful items as needed makes outdoor pursuits more enjoyable.

For the making of shelters, off ground sleeping platforms, chairs, cooking fire tripods, equipment hangers, ladders, hunting gear, etc., the local forest, or woods, will need to be harvested for sticks and branches, of the required dimensions, for the various structures intended to be built. This will require tools that will need to be made or brought to the location.

Woodcutting tools like knives, hatchets, and saws are essential for obtaining wood for the purposes mentioned above and for firewood. While knives and hatchets are easily transportable, saws for cutting trees and logs are cumbersome and not easily packed along with your gear. Small foldable saws are available and in an attempt to reduce the weight and size, chainsaw cutting chains are sold with straps and rings at each end for manual cutting. These manual chainsaws require a lot of effort and without being effectively put under tension in a bow saw configuration, they continually bind on the log or tree being cut. The typical rings and straps supplied with these manual chainsaws can be slipped over each end of a branch to form a bow saw, but straps and rings slip under tension along the bowed wood limb. These manual chainsaws and folding saws are currently the best available for lightweight backpacking and survival situations.

Having obtained suitable sticks and branches the current state of the art is to notch the wood and lash them together using cord to form various structures, sometimes integrating trees into that structure. Notching and lashing wood to form stable and secure structures takes practice and patience and in the case of notching, extreme care needs to be taken not to cut oneself. With enough cord and the skill to notch and lash sticks together at various angles, a stable structure can be formed given time. Structures can be lashed together more quickly without the use of notches, but the connections lack the rotational stability provide by a notch or flat surface. Often a hastily built shelter, to get out of bad weather quickly, needs to be rebuilt when there is more time available or a better location is found. Downsides of lashing a shelter together are that it is hard to recover and hence reuse the lashing plate material, and it takes time to undo if the correct type of knots are not used. Even if the used lashing is recovered undamaged, it is now a set of shorter length pieces not suitable for the building of the next shelter or structure.

In addition to survival and backpacking, there are many outdoor activities that make use of lashing and other connection techniques to provide frameworks for temporary or semi-permanent structures such as; plant support canes and sticks, greenhouses, tents, hammock supports, hunting hides and stands, game hangers, bridges, benches, viewing platforms, and kids playhouses to name a few. All of these temporary structures, if made from locally sourced branches and sticks, require time to build and to breakdown. In addition, the skills need to lash these temporary structures confidently together, often inhibits the fabrication of a structure that is inherently green and environmentally friendly, in favor of a more costly prefabricated solution. The lack of skills relating to lashing even simple wood structures, like a tripod for support of a camera, can result in frustration simply because you could not get the steady position needed for the long exposure shot and you did not bring your heavy and bulky tripod with you.

Another issue with traditional lashing is that, depending on the material, they can fray or lose strength due to friction and exposure to the elements. Semi-permanent structures built with lashing needed to be carefully inspected before use if they have been left out unprotected. Additionally, it is often surprising how much cordage is actually required to form a structure, especially if large weights need to be supported.

While lashing and notching have drawbacks, other typical wood connection systems are not suitable for outdoor fabrication using locally sourced materials. Most, if not all quick wood connection systems require either milled flat or cylindrical members, while other traditional joining methods need holes and shapes carved into the members for connection. Metal fasteners like nails and screws are not suitable for securing essentially cylindrical natural members like sticks, as they are difficult to put into small sticks, and because leverage is on a single point of each member, with no side support, they easily disengage. Nails and even screws can also easily split wood, especially thinner sticks. Equally a simple hole in a plate, as shown in U.S. Pat. No. 4,146,010 FIG. 2, and commonly seen on caulking guns and spring clips found under sinks, relies on frictional forces between two hard materials, requires a relatively smooth rod and can not be applied to a non-uniform stick unless the hole is much larger than the mean diameter of the stick. Even then, the larger hole's edge would only grip in a direction parallel to the force on the stick, not offering any rotational stability, and would be susceptible to losing its grip altogether if the frictional force on the rod from the hole's edge is removed. U.S. Pat. Nos. 4,631,783 and 6,932,223 describes holding plates for screwdrivers while U.S. Pat. Nos. 4,856,221 and 5,307,585 describes a fishing rod holder. Both sets of patents, while describing a holding mechanism, are specifically designed to hold a screw-driver or fishing rod respectively, but not to bite into and secure them using a cutting edge or teeth. In fact they are designed to release the held screw-driver or fishing rod undamaged when a force is applied to the driver or rod, which will not work for construction of outdoor structures and tools. Existing wood connecting plates with teeth, as described in U.S. Pat. No. 4,318,652 for example, are designed to work on flat, planed surface areas of lumber found in typically housing and outdoor deck construction. The perpendicular punched teeth of these connection plates can not effectively engage and hold together uneven and essentially cylindrically shaped natural members. Such lumber connection plates are however very effective, robust, easy to use, and economical to produce from sheet metal. US Patent Application 2010/0108851 describes a holder for a Christmas tree stand that uses flexible resilient material flaps to center and hold the tree. The flaps flex away to insert the cut end of the tree and while they are capable of supporting a tree in the upright position, the flexible nature of the flaps would not hold a tree in position if it moved far off the vertical axis.

SUMMARY OF THE INVENTION

Technical Problem

The broad objective of the present invention is to provide a cost effective, compact and relatively lightweight device that can facilitate the quick fabrication of useful tools and solid, strong, stable structures using locally sourced natural members, with minimal skills required, in potential bad environmental conditions. Thus increasing the survival chances and comfort of people in outdoor survival situations.

Another objective of the present invention is to make the device reliable, long lasting and reusable, even when left out and exposed to the elements. Thus providing reuse of the device and also enabling long term use if needed.

A further objective of the present invention is to provide a device that can scale with a wide range of natural member engagement or biting options, including but not limited to size, shape, number of biting edges, gripping action, the number of members interconnected, and the number and type of flexible connections that can be made by the device. Thus providing more options for the type of structures and tools that can be built.

Solution to Problem

The invention presented here aims to solve the problems identified by using metal lashing plates to join together the natural members found in woods and forest areas, to form tools and structures. The metal lashing plates of the present invention are preferably fabricated from thin metal sheet with a plurality of holes, cutouts, notches, slots, and tabs in the sheet metal and can also incorporate bends, folds, and pressed structures to add functionality and strength. The metal lashing plate's construction is known to those familiar in the art and can be produced through a variety of common production methodologies essentially selected from the group of laser, water and plasma cutting, stamping, pressing, punching, bending, folding, forging, casting, welding, and grinding. While the present invention's currently preferred fabrication method is from sheet metal, the metal lashing plates could be formed through additive metal manufacturing techniques and can be made from other material or of composite construction.

The novel aspect of the present invention relates to the incorporation of at least one through hole or cutout in the metal lashing plate that contains a plurality of hard, relative to the natural member, sharp edges formed predominantly within the rim of the through hole or cutout, and designed to engage an essentially cylindrical natural member, upsetting and biting into the outer layer or layers of fibers to lock the natural member in place, when it is rotated in, or moved off axis from the metal lashing plate, by an applied force on either the natural member, the metal lashing plate or both. The biting action can be enhanced by incorporating profile features like cams into the through hole or cutout, and by the design of the cutting edges themselves. The holes and cutouts with sharp edges can be scaled to accommodate different diameter natural members and the number and shape of sharp edges can be configured to help adapt to different types of natural materials. For the sake of brevity and clarity the through holes or cutouts incorporating the plurality of sharp edges will be referred to as the metal lashing plate's bite or bites herein.

Advantageous Effects of Invention

The present invention provides those forced to, or who chose to, live outside without the benefits of modern facilities an expeditious means of fabricating essential tools and structure to survive. Metal lashing plates, as described here, allow those skilled and unskilled in bushcraft survival techniques to quickly make use of the readily available bulk materials in woods and forests, without the need to transport processed lumber or other bulky and heavy rods, poles, tubes and supports for construction purposes. The lightweight, robust and compact design of the metal lashing plates, in conjunction with their ease of use, provides an innovative system for construction using naturally available resources.

While the present invention described herein is directed towards the outdoor fabrication of survival tools and structures using natural members, metal lashing plates of the present invention can be used to aid in the fabrication of other things for agricultural, hunting, construction and recreational purposes. While natural members found outdoors will typically be sticks and branches, metal lashing plates of the present invention would also work with processed natural members, like wooden poles, rods and dowels for example. And providing the material forming the outer layer or layers of a member is of a lower hardness rating than that of the bite, then any metal lashing plate and bite material combination will work. The ability to scale metal lashing plates also opens up their application in areas too numerous to be covered by the inventors in this disclosure of the present invention, but are within the scope of the present invention.

BRIEF DESCRIPTION OF THE DRAWINGS

FIG. 18 shows a credit card sized metal lashing plate.

FIG. 19 shows a view of a tripod made from the card to hold a smartphone.

FIG. 19A shows an alternative view of the card tripod made to hold a smartphone.

DESCRIPTION OF THE EMBODIMENT

The preferred embodiment of the present invention, described herein, is a lightweight plate made from sheet metal and either laser cut or punched to form a single bite or plurality of bites, along with additional connection options to other types of connectors, components, devices, equipment, parts, tools, and to another metal lashing plate. The following explanation of the drawings provides examples of certain embodiment's of the present invention, to help explain the present invention, but is not intended to limit the embodiments of the present invention.

Figure 1:
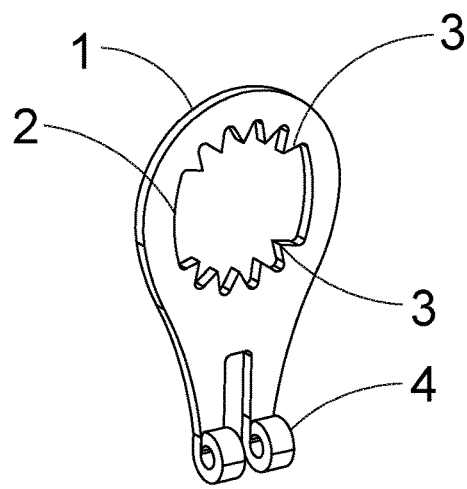
FIG. 1 shows an orthogonal view of an example of a metal lashing plate with a single bite.
Figures 1A, 1B:
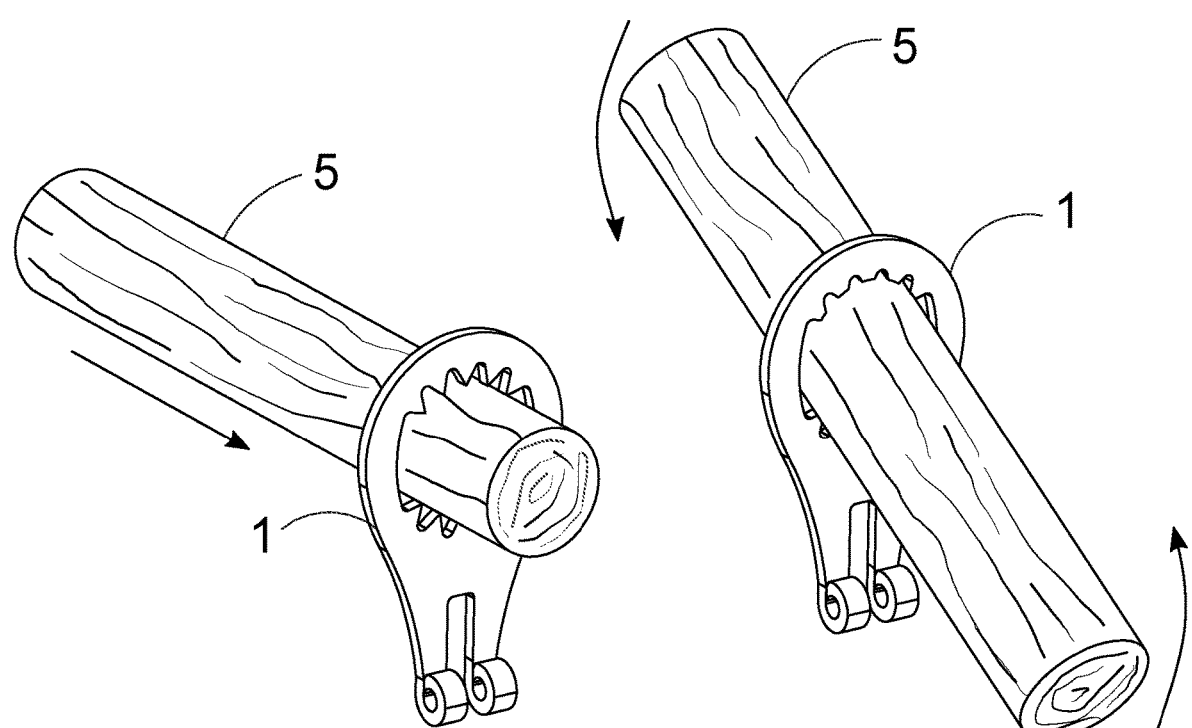
FIG. 1A shows the insertion of a natural member into the metal lashing plate.
FIG. 1B shows the engagement of the metal lashing plate's bite.

FIG. 1 shows an orthogonal view of an example of a simple metal lashing plate 1 with a single bite 2 showing a plurality of sharp edges 3 forming the bite. The sharp edges 3 of the bite 2 are formed in the space within, above and below the area defined by the rim of the through hole and can protrude inward, upward, downward, or in any combination of those directions into the space. The rim of the bite is defined as the outside edge of the bite, where the base of the sharp edges connect with the rest of the metal lashing plate's body. The folded metal 4 provides one means of connecting or attaching a metal lashing plate connectors, components, devices, equipment, parts, tools, and to another metal lashing plate. FIG. 1A shows the insertion of a natural member 5 into the metal lashing plate 1. FIG. 1B show engagement of the metal lashing plate's bite, with the sharp edges digging into the natural member, by forcing the natural member off axis from the metal lashing plate. The thickness of the sheet metal used to make a metal lashing plate is minimized to keep the weight as low as possible. The chosen thickness is based on the anticipated use of the metal lashing plate type and the expected off axis and rotational forces that will be applied. The metal lashing plate secures the natural member as securely, if not more securely, than traditional lashings, is vastly stronger than any lashings made from cordage, and requires no knot tying expertise. Unlike other metal fasteners, like nails or screws, it does not risk splitting the wood as it acts on the outer layers of the natural member. Also unlike traditional lumber connector plates the metal lashing plate works effectively with essentially cylindrical and irregular natural members found in woods and forests.

Figure 2:
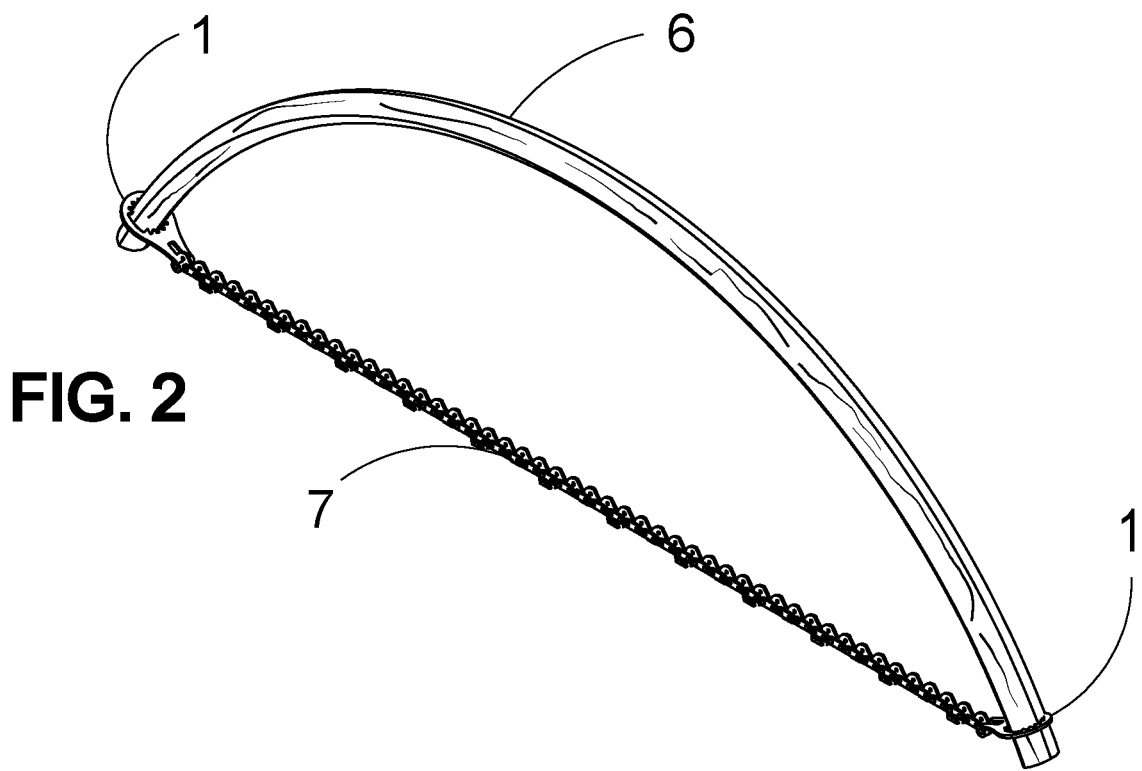
FIG. 2 shows the construction of a bow saw using metal lashing plates.
Figure 2A:
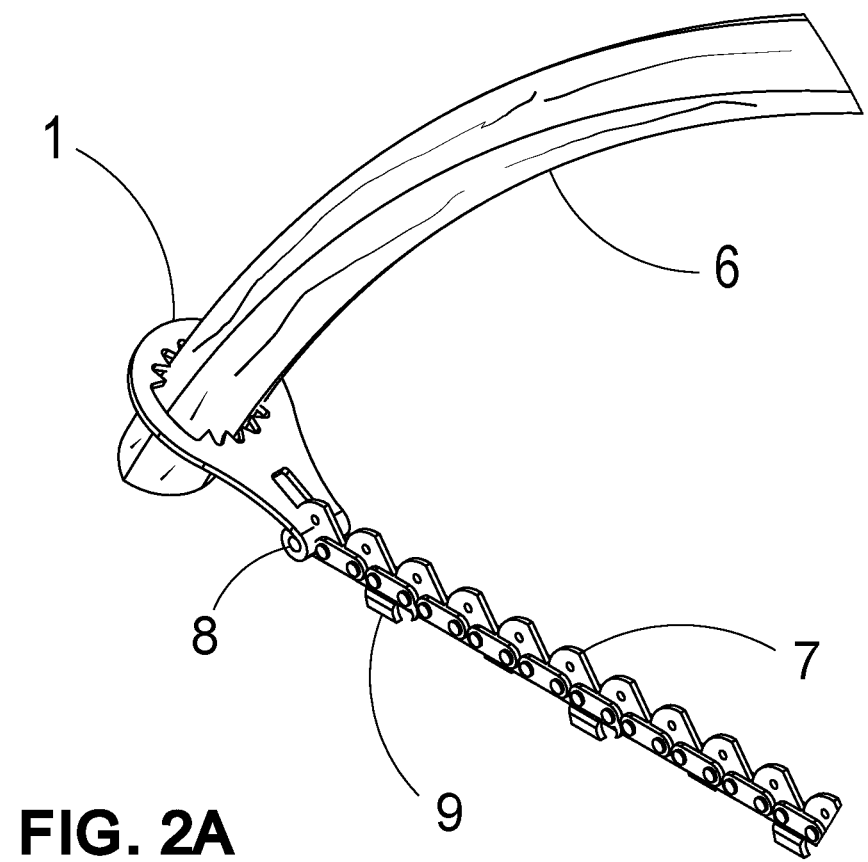
FIG. 2A shows a detailed view of the metal lashing plate connection.

Those familiar and skilled in the art of bushcraft survival techniques, outdoor living and emergency preparation will understand the many and various applications the present invention could be applied to. An example of a simple tool that can be fashioned on site using a locally sourced natural member and metal lashing plates is a bow saw. FIG. 2 shows the use of two metal lashing plates 1, of the type shown in FIG. 1, being used with a chainsaw cutting chain 7 to make a bow saw when tensioned by a natural member 6. In the detailed view of FIG. 2A, pin 8 is used to connect the manual chainsaw cutting chain 7 to the metal lashing plates. The manual chainsaw cutting chain 7 and associated teeth 9 shown in FIG. 2A are not claimed as part of the present invention only used in conjunction with the metal lashing plate 1 of the present invention. While manual chainsaw cutting chains have been used for felling trees, usually by grabbing both ends placed around a tree or branch it takes a lot of effort. Putting more tension on the chainsaw cutting chain using a sprung wooden limb makes the job of cutting wood much easier. The existing simple loops or rings on the ends of available manual chainsaw cutting chains require notching of the natural member to stop them slipping, the notching needs to be carefully done to not weaken the end of the natural member, yet be deep enough to hold the loops or rings. The metal lashing plate 1 provides a quick and secure way of attaching a manual chainsaw cutting chain 7 so that it can be put under tension, to facilitate the harvesting of natural members for further construction purposes.

Figure 3:
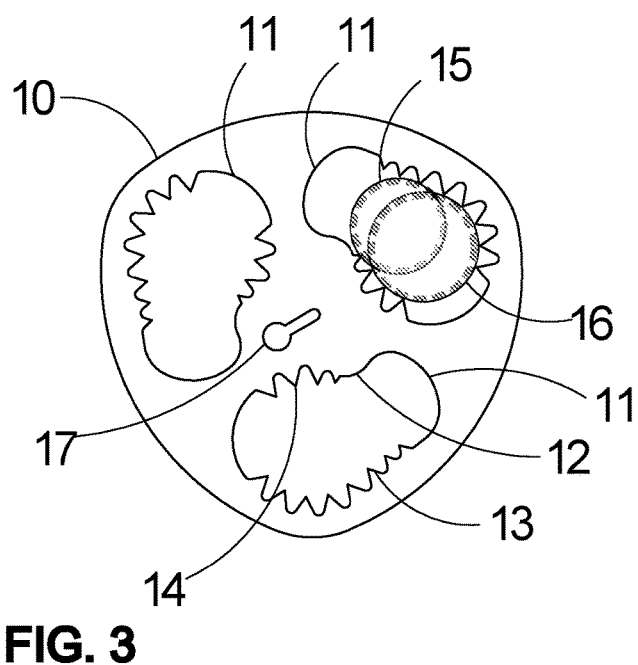
FIG. 3 shows a top view of a metal lashing plate with a plurality of bites and a keyhole.
Figure 3A:
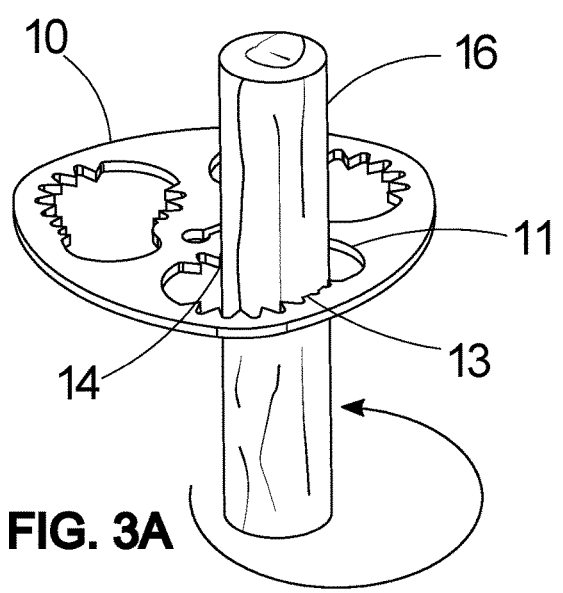
FIG. 3A shows engagement under natural member rotation.
Figure 3B:
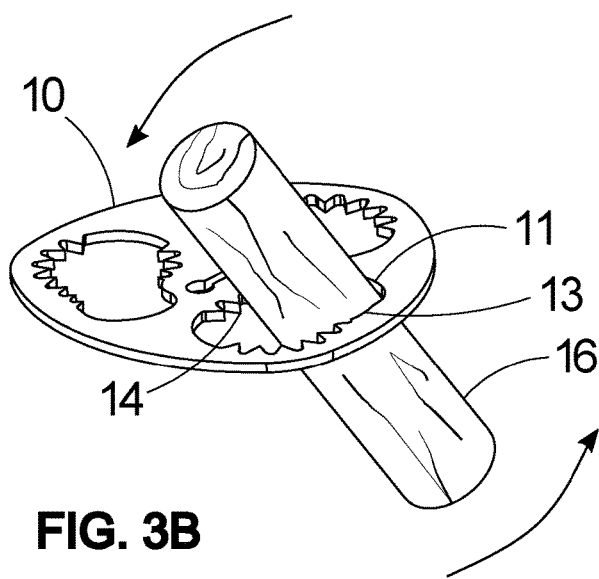
FIG. 3B shows rotation when the natural member is forced off axis.

In many applications more than one natural member will need to be connected to form a structure. FIG. 3 shows a top view of another type of a metal lashing plate 10 as an object of the present invention, this time with a plurality of bites 11 and a single keyhole 17 for attaching a chain, knotted cord or wire with ball stops. The bite has a cam 12 profile feature incorporated to force a natural member onto the sharp edges 13 when the natural member is rotated as in FIG. 3A and both sharp edges 13 & 14 are engaged when the natural member is forced off axis as shown in FIG. 3B. The outline of two natural members of different sizes 15 & 16 can be accommodated due to the shape of the bite 11, which is larger at one end and narrows towards the other end. The shape of a bite can take any form and incorporates various sharp edge geometries not just those shown, including sharp edges in multiple surface planes. The cam 12 profile feature can also have sharp edges associated with it, and a simple triangular hole with sharp edges would in some cases be adequate to engage and hold the natural member. Those familiar and skilled in the arts of making saw blades, cutting, threading and tapping wood will be able to appreciate the various benefits of different angles and edge features that would maximize the metal lashing plate bites' effectiveness.

Figure 4:
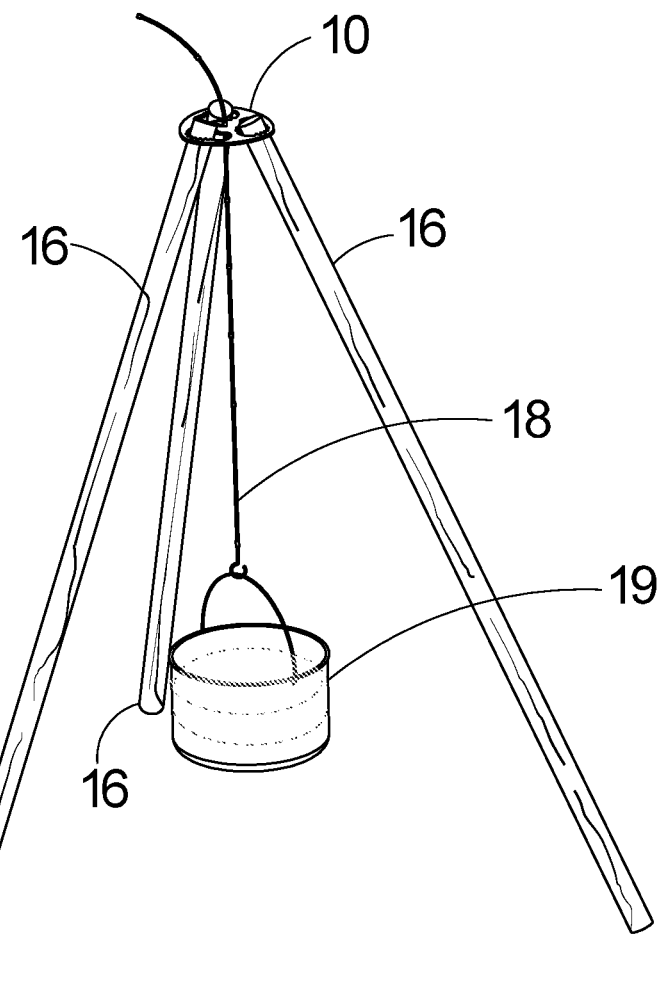
FIG. 4 shows a campfire cooking tripod formed with a metal lashing plate.
Figure 4A:
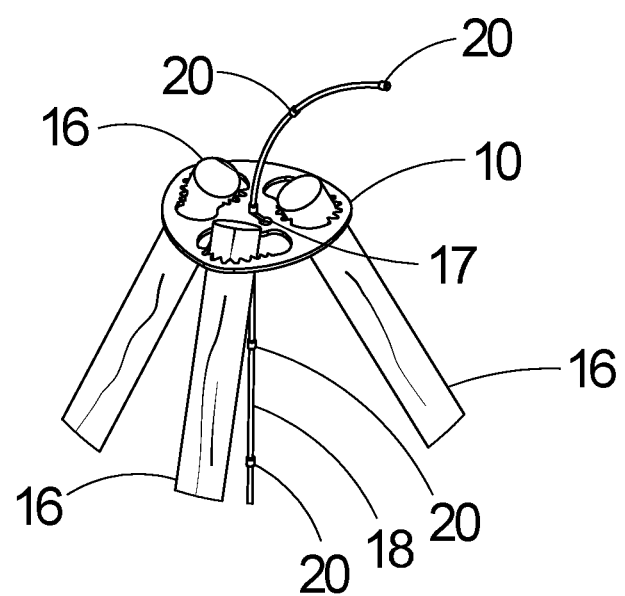
FIG. 4A shows a detailed view of the tripod's metal lashing plate connection.

One of the simplest structures used outdoors is the tripod. Tripods, because of their stability on uneven surfaces have lots of applications. FIG. 4 shows a use for a metal lashing plate 10 as shown in FIG. 3, to form a camping or backyard fire cooking tripod. A cooking pot 19, or grill, is suspended via a hook and wire 18 from the tripod formed from the metal lashing plate 10 and three natural members 16. As ordinary campers know, the natural members 16 used for a tripod over a campfire should be green sticks that will not burn. FIG. 4A shows the support wire 18 passing through the metal lashing plate's keyhole 17 where the pot's height can be adjusted through stops 20 along the wire, or chain links if a chain is used. Items 18, 19, and 20 are not claimed as part of the present invention only used in conjunction with the metal lashing plate 10 of the present invention. The size of the metal lashing plate for this application can be scaled to the cooking task at hand, from a single one person cup to a large and robust tripod capable of supporting a full cast iron Dutch Oven. Irrespective of the size of the cooking tripod the proportional saving in carried weight, by using locally sourced natural member, rather than fabricated tripod limbs is significant. The overall cost for the tripod using metal lashing plates should also be less than a fabricated tripod as there is no cost associated with the limbs.

Figure 5:
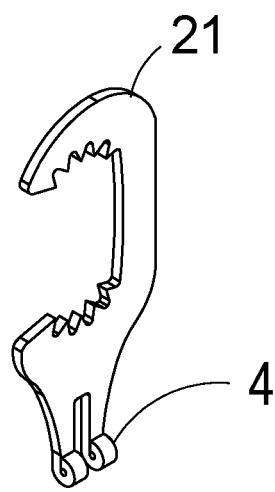
FIG. 5 shows an open bite type of a metal lashing plate.
Figure 6:
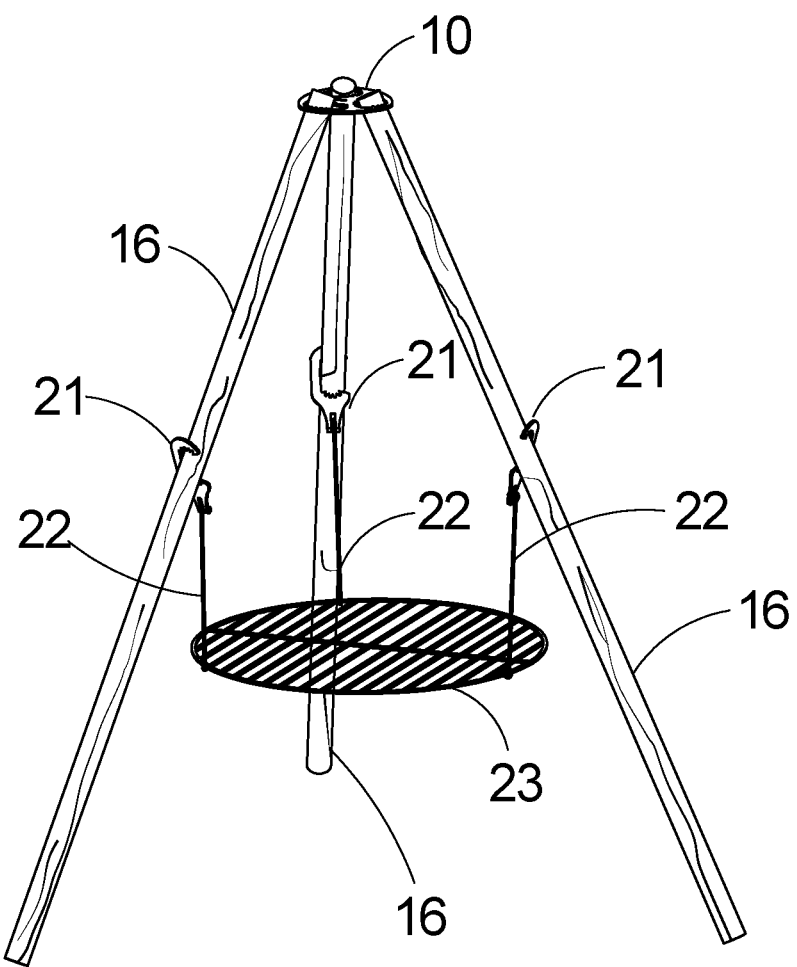
FIG. 6 shows the open bite type supporting a grill on a cooking tripod.

The bites in the metal lashing plates described so far have all been based on a hole of various shapes in a metal plate. In many applications it would be advantageous to have an open hole, or cutout, to form the bite in the metal lashing plate. FIG. 5 shows an example of a cutout version 21 of the metal lashing plate 1 of FIG. 1. While the metal lashing plate 21 might look like a hook, that is not the intended function, the cutout allows the metal lashing plate to be placed around a natural member when access is not available from an end of the natural member. The metal lashing plate 21 works in a similar manner to the other metal lashing plate previously described by biting into natural member 16. The three metal lashing plate 21, of the type shown in FIG. 5 are shown in the cooking tripod example of FIG. 6. The cooking tripod of FIG. 6 is formed with the use of a metal lashing plate 10 and supports a grill 23 from metal rods 22 attached to the metal lashing plates 21 which bite into the natural member 16 of the tripod. The grill 23 and metal rods 22, which are not claimed as part of the present invention only used in conjunction with the metal lashing plate 21 of the present invention, are an alternative cooking option to that shown in FIG. 4 for a cooking tripod fabricated from a metal lashing plate 10 of this present invention.

Figure 7:
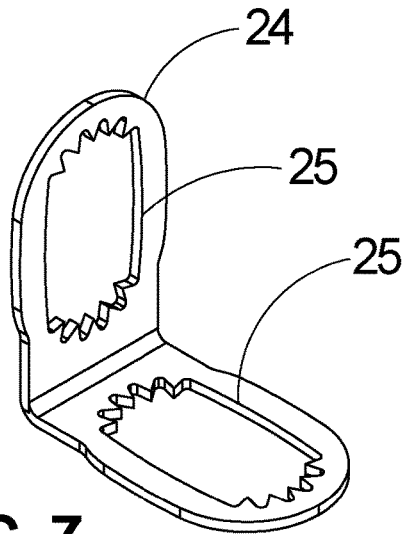
FIG. 7 shows a metal lashing plate with two elongated bites and a right angle bend.
Figure 8:
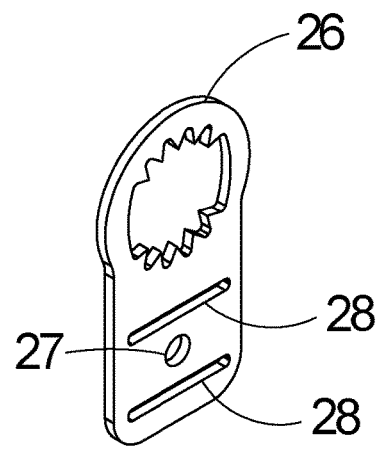
FIG. 8 shows a metal lashing plate with both a cord connection hole and strap connection slots.
Figure 9:
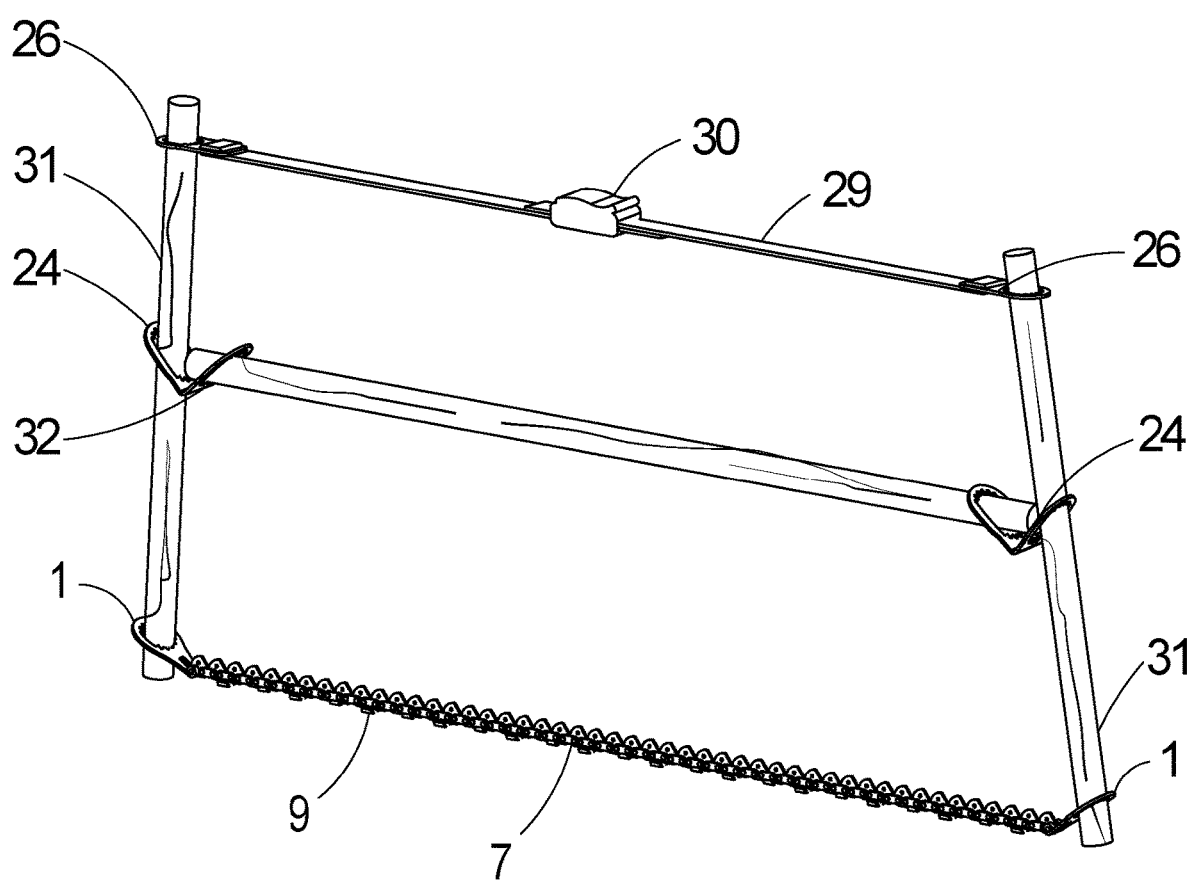
FIG. 9 shows construction of a "H" frame saw using multiple types of metal lashing plates.

Not only can the present invention be used for simple tools and structures, it should now become obvious, based on the previous examples, that more complicated tools and structures can be fabricated from locally sourced natural members with a few easily portable metal lashing plates. Additionally, the combination of various bite designs with other connection options incorporated into a metal lashing plate provides for a vast range of possible applications. While not limiting the scope and combinations of features that could find practical use, FIG. 7 and FIG. 8 show two additional metal lashing plate options 24 & 26 respectively. FIG. 7 shows an example of a metal lashing plate 24 that incorporates a bend and elongated bites 25. The elongated bite is just one example of a bite shape that makes it possible to have natural members attach at different angles for use in tool or structure fabrication. FIG. 8 shows an example of a metal lashing plate 26 with a bite 2 similar to that shown in FIG. 1, but this time with a hole 27 and slots 28 incorporated, The hole and slots enable the connection of cord or straps to a metal lashing plate. FIG. 9 shows the use of these two types of metal lashing plate 24 & 26 in the fabrication of a slightly more complex "H" frame saw. As in the bow saw of FIG. 2, the manual chainsaw cutter chain 7 is attached to two natural members 31 by metal lashing plates 1. Natural member 32 is attached by metal lashing plates 24, of the type shown in FIG. 7, to the natural members 31. The saw is put under tension by the strap tension device 30, with the straps 29 pulling on the natural members 31 connected through metal lashing plates 26 as shown in FIG. 7. The straps 29 and strap tension device 32, not claimed as part of the present invention only used in conjunction with the metal lashing plate 28 of the present invention, can of course be replaced by some other simple tensioning system like a cord with a twist tension mechanism connected to the metal lashing plates 26 by means of holes 27.

The saw examples of the present invention described above and shown in FIG. 2 and FIG. 9, demonstrate two of the many variations of a tool that can be fabricated, using locally sourced natural members, using metal lashing plates of the present invention. The saw examples equally highlights the numerous possible application of metal lashing plates apparent to anyone skilled in the art of tool making and while not described here as part of the present invention would fall within the scope of the present invention.

Figure 10:
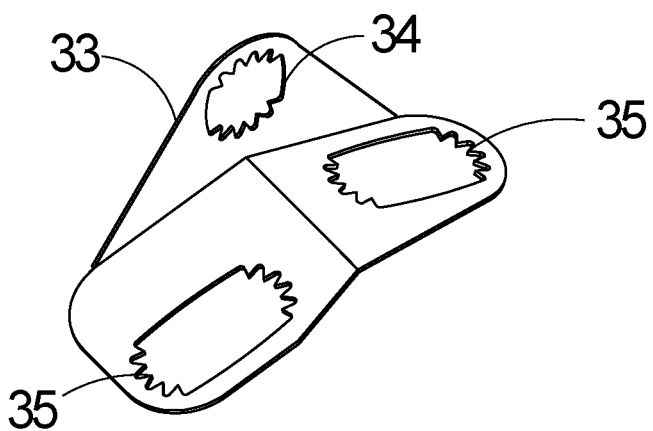
FIG. 10 shows a metal lashing plate with bites in three different plains
Figure 11:
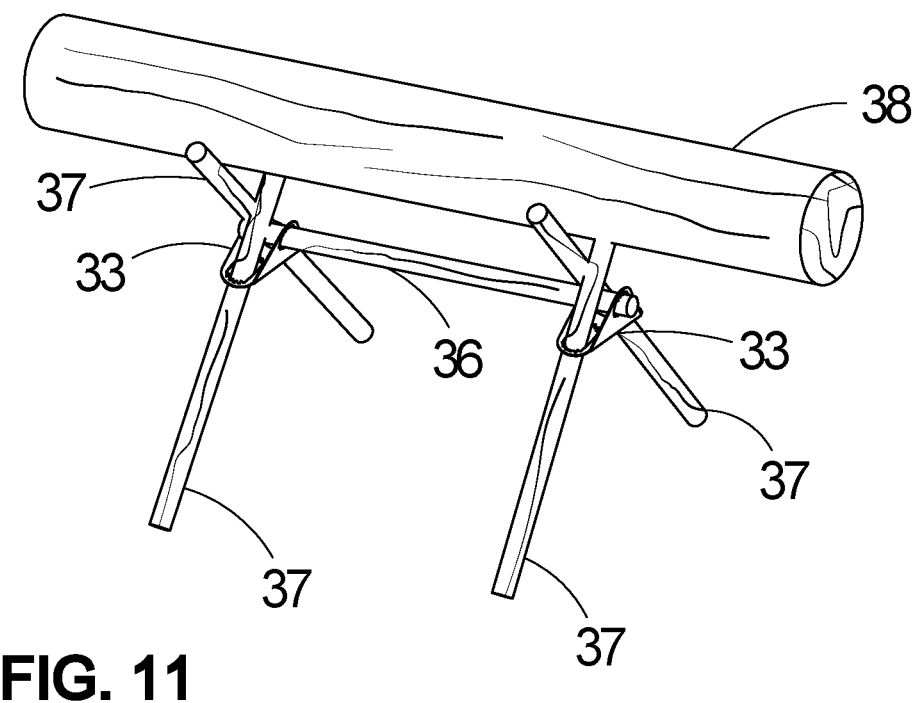
FIG. 11 shows the three angled metal lashing plate in use in the construction of a sawhorse.

For larger scale structures a lot of natural members will need to be cut to size, using saws as described in FIG. 2 & FIG. 9 or any other types of saw available. The metal lashing plate 33 of FIG. 10 can help with the task as it allows for the efficient construction of a sawing horse as shown in FIG. 11. The metal lashing plates 33, while lightweight, can be made strong enough to support larger natural members like the log 38 for comfortable and safe cutting, with the sawhorse weight capacity being only limited by the natural members 36 & 37 used. The embodiment of the metal lashing plate 33 shown in FIG. 10 further highlights an object of the present invention, first shown in FIG. 7, that the individual bites 34 & 35, as with any cutout, holes, slots and tabs if present in the metal lashing plate, can be orientated at various angles and act in various planes.

Metal lashing plates as described in the present invention by the inventors can be flat plates or three dimensional plates, bent, formed, or melded together characterized by the high aspect ratio of the bites, cutout, holes, slots and tabs surface area to that of the surrounding metal thickness. The thickness of the metal needs only be sufficient to transmit the forces on the structure into the natural members, with the natural members limiting overall structural strength. Even thin metal is inherently stronger than the typical cordage used for lashing together natural members in outdoor pursuits and activities like backpacking and camping. For those preparing for survival after a natural disaster or participating in outdoor bike and ATV activities larger structures could be required.

Figure 12:
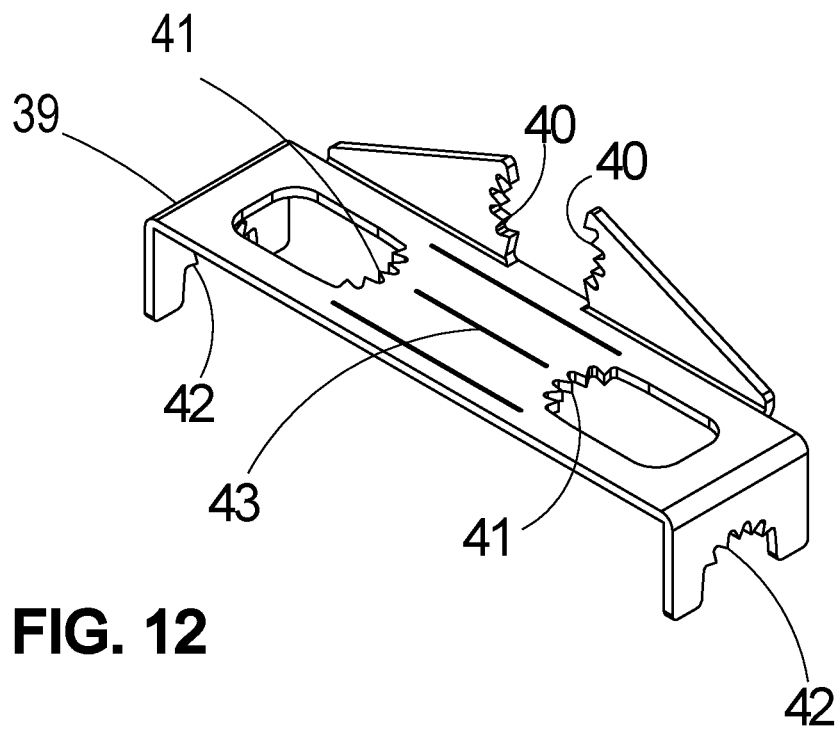
FIG. 12 shows a roof truss version of a metal lashing plate.
Figure 13:
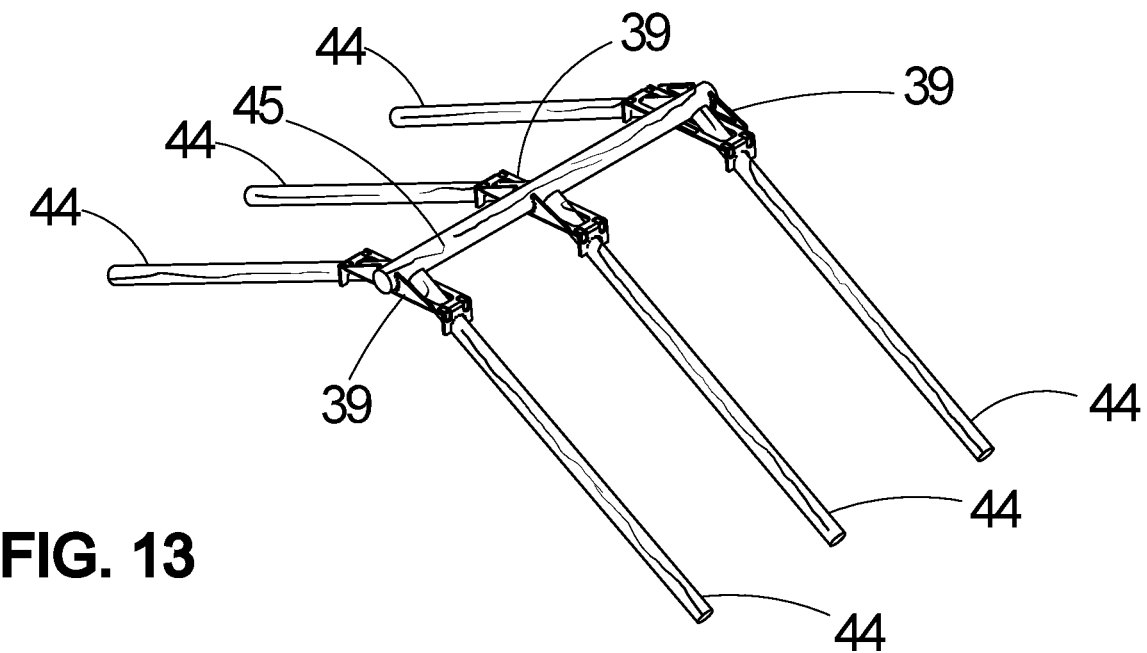
FIG. 13 shows the use of metal lashing plate to form a roof truss.

FIG. 12 shows one possible variation of a metal lashing plate 39 that can be used in fabricating a large shelter and makes use of both open 40 & 42 and closed bites 41. For purposes of clarity in the drawings bites 40 are not shown on one side of the metal lashing plate 39. FIG. 13 shows the metal lashing plates 39 being used to form a roof truss for a shelter where natural members 44 are angled through bites 41 and 42, while bites 40 hold in place natural member 45 to form the truss structure. The length of the bites 41 would dictate the angle of the natural members and therefore the roof's slope. After being initially engaged by rotation or off axis movement, the weight of the natural members acting on the bites will further engage the wood's outer fiber layers and solidify the structure. The lines 43 on metal lashing plate 39 are pressed corrugations that stiffen the metal lashing plate, a process familiar to those in the art of metal sheet fabrication. Such features can be included in the metal lashing plate 39 to strengthen it without adding weight from using thicker metal. The truss structure formed is similar to that made from construction lumber, but the metal lashings can work with unprocessed natural members found or harvested locally.

Figure 14:
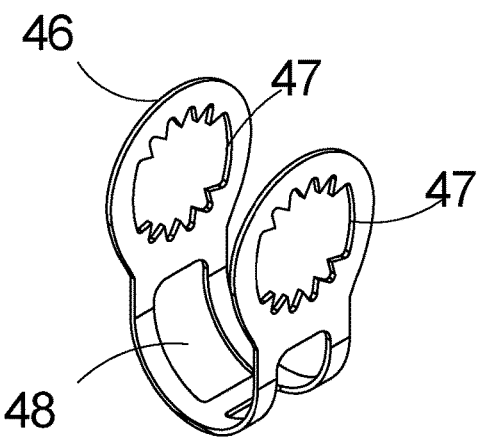
FIG. 14 shows a bridge building version of a metal lashing plate.
Figure 15:
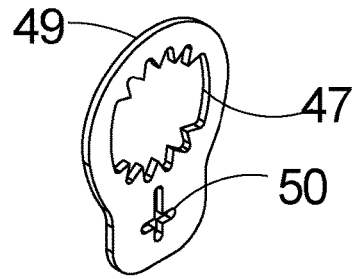
FIG. 15 shows a metal lashing plate with a chain cross connection.
Figure 15A:
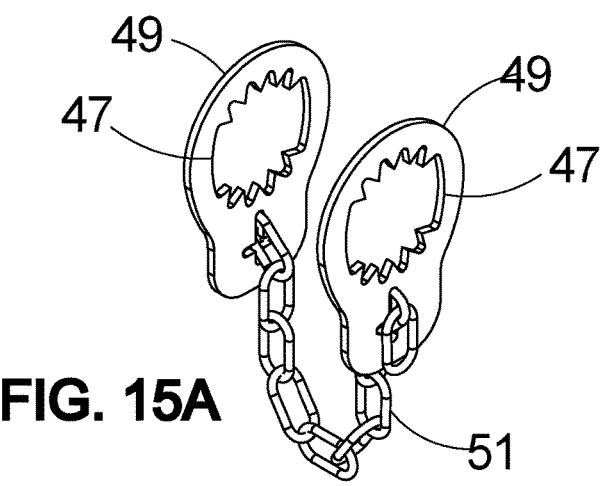
FIG. 15A shows two metal lashing plates connected by a chain.
Figure 16:
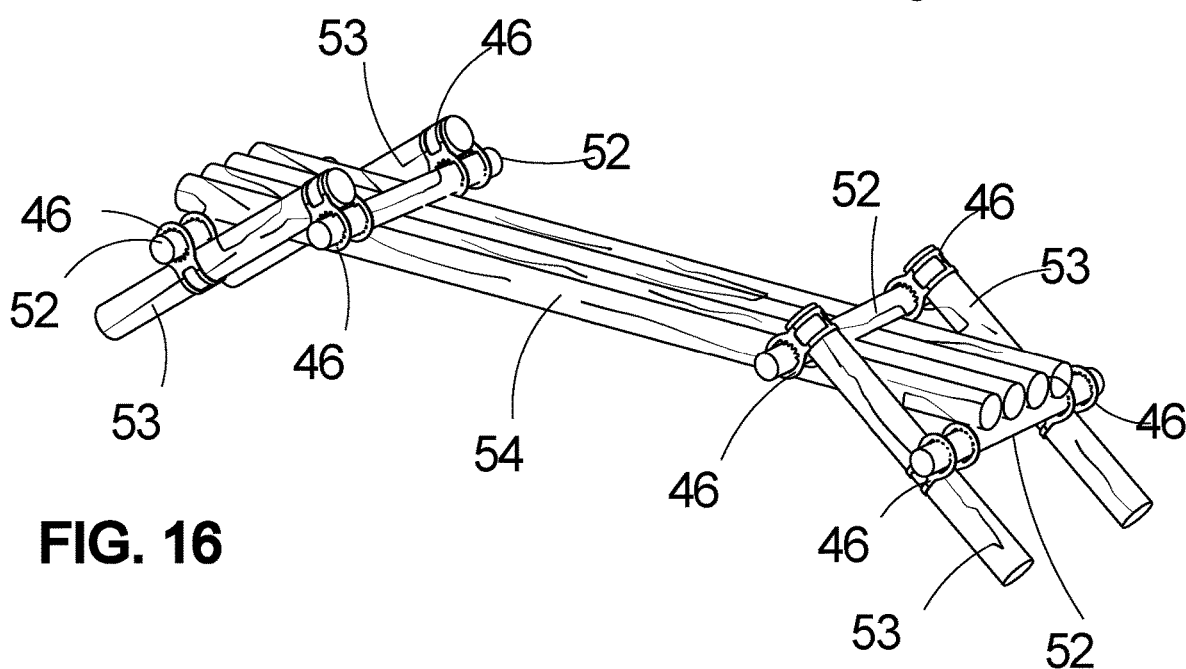
FIG. 16 shows a Leonardo style bridge made from metal lashing plates.

FIG. 14 and FIGS. 15 & 15A show metal lashing plates 46 & 49 that can be used for the construction of a Leonardo style bridge as shown in FIG. 16 and normally constructed with notches in wood members or wood lashed together. The difference between metal lashing plates of FIG. 14 FIGS. 15 & 15A is mainly in form not function. As the function of the metal lashing plates are describe it will become obvious that other metal lashing plate arrangements could be used to effect the same result. In FIG. 16, showing the bridge, metal lashing plates 46 engage the natural members 52 with bites 47 shown in FIG. 14. Natural members 53 are then grasped and held against natural members 52 by the metal connecting the two bites 47 of the metal lashing plates 46 to form frames, to hold and support larger members. The natural members 54 are then cantilevered between the frames to form the bridge span. The metal lashing plate 46 of FIG. 14 would not need to be thick and can be transported flat, then easily bent on site. Hole 48 would make the bending easier and the metal lashing plate lighter through the removal of the metal. FIG. 15A shows two metal lashing plates 49 connected by a chain 51. The function of chain 51 in building the bridge is the same as the metal connecting the two bites 47 of metal lashing plate 46 in that it simply grasps and holds natural member 53 against natural member 54. In the case, where the metal lashing plates 49 and chain 51 of FIG. 15A are used, the chain length between the two metal lashing plates 49 can be adjusted and locked in position by use of the incorporated chain cross locks 50. Either metal lashing plate design 46 or 49 would provide for a robust structure that can be easily constructed with minimal material having to be carried into the woods or forest.

While in FIG. 16 natural members 54 are held in place by natural members 52 & 53 formed into a frame to indirectly form a structure it should now also be obvious, from the other previous disclosures of the present inventions use, that metal lashing plates can be used to directly interconnect and hold natural members like 54 in place to form a bridge or wall structure. Without the need for additional drawings it should be easy to see multiple ways of how a series of metal lashing plates, with two or more interconnected bites, can be used to lash natural members together. Such structures would be sturdier and longer lasting than a similar structure using cordage for lashings and be easier to work with. Multiple types of metal lashing plates can be used in conjunction with each other to form very complex structures.

Figure 17:
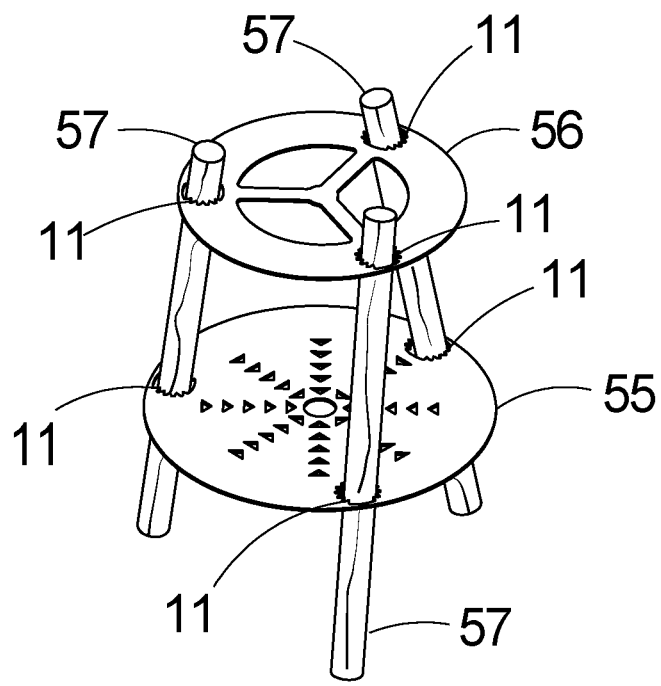
FIG. 17 shows two metal lashing plates forming a twist locking structure.
Figure 17A:
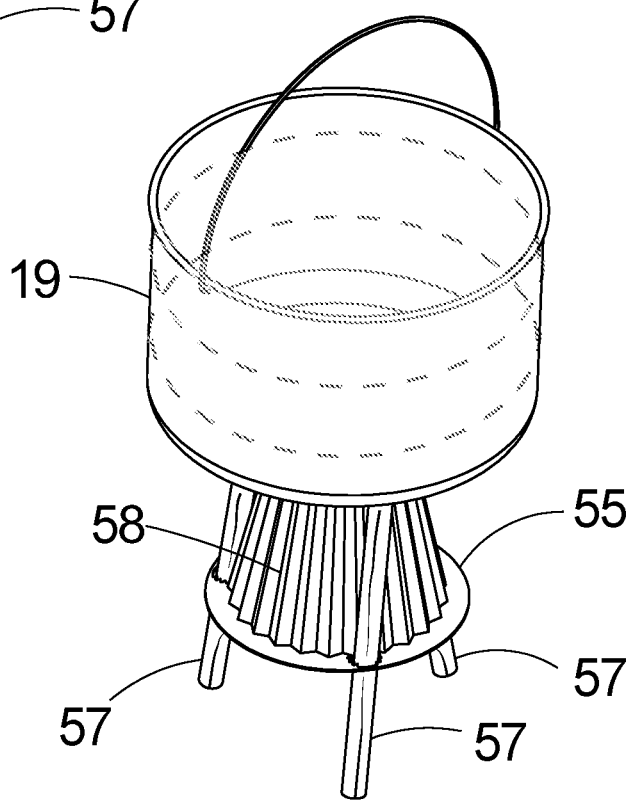
FIG. 17A shows the twist locking structure capturing material within the structure to form a camping stove.

The designs variations, applications, and combinations of metal lashing plates of the present invention encompass and lends themselves to so many uses. For example two variations of the tripod metal lashing plate 10 of FIG. 3 are shown in FIG. 17, where the two metal lashing plates 55 & 56 are interconnected by three natural members 57. Twisting the metal lashing plate 55 clockwise, while twisting the metal lashing plate 56 counter clockwise, results in a robust cylindrical frame as the bites 11 of metal lashing plates 55 and 56 engage natural members 57. If the metal lashing plate 55 is larger than the metal lashing plate 56 then a robust conical frame is formed. The design of both metal lashings plates can incorporate features to capture and support other materials within the frame as shown in FIG. 17A. If the material 58 of FIG. 17A is a sheet of metal foil, captured and held in place to form a cylinder, by the top and bottom metal lashing plates 55 & 56 and the three natural members 57, you have the bases of a camp stove when the structure is compressed during twisting. The additional holes and structures of the metal lashing plates 55 & 56 should now be apparent. The camp stove could range in size from a single person's backpacking twig stove to a large group camping stove capable of supporting a large pot 19, which is not part of the present invention. If the material 58 is a sheet of rolled up translucent plastic, or a metal mesh, then by placing a candle or oil lamp on the metal lashing plate 55 you would have a lantern. In both examples the material 58, which of itself is not claimed as part of the present invention, can be very thin as the natural members 57 and the metal lashing plates 55 & 56 are providing the supporting structure. It should be obvious that if the metal lashing plates 55 & 56 had more bites around the circumferences of the plates a solid basket or cage could be easily formed from locally harvested natural members. Equally, multiple metal lashing plates can be inter connected to form similar structures.

Figure 20:
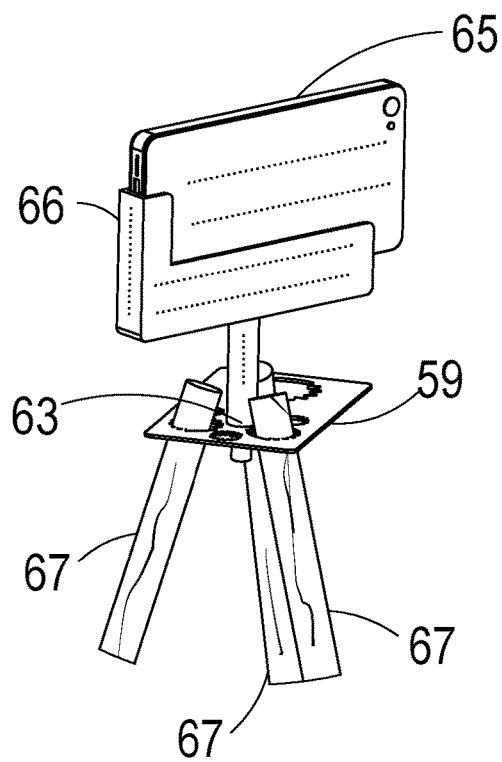
FIG. 20 shows the card tripod with a smartphone holder.
Figure 21:
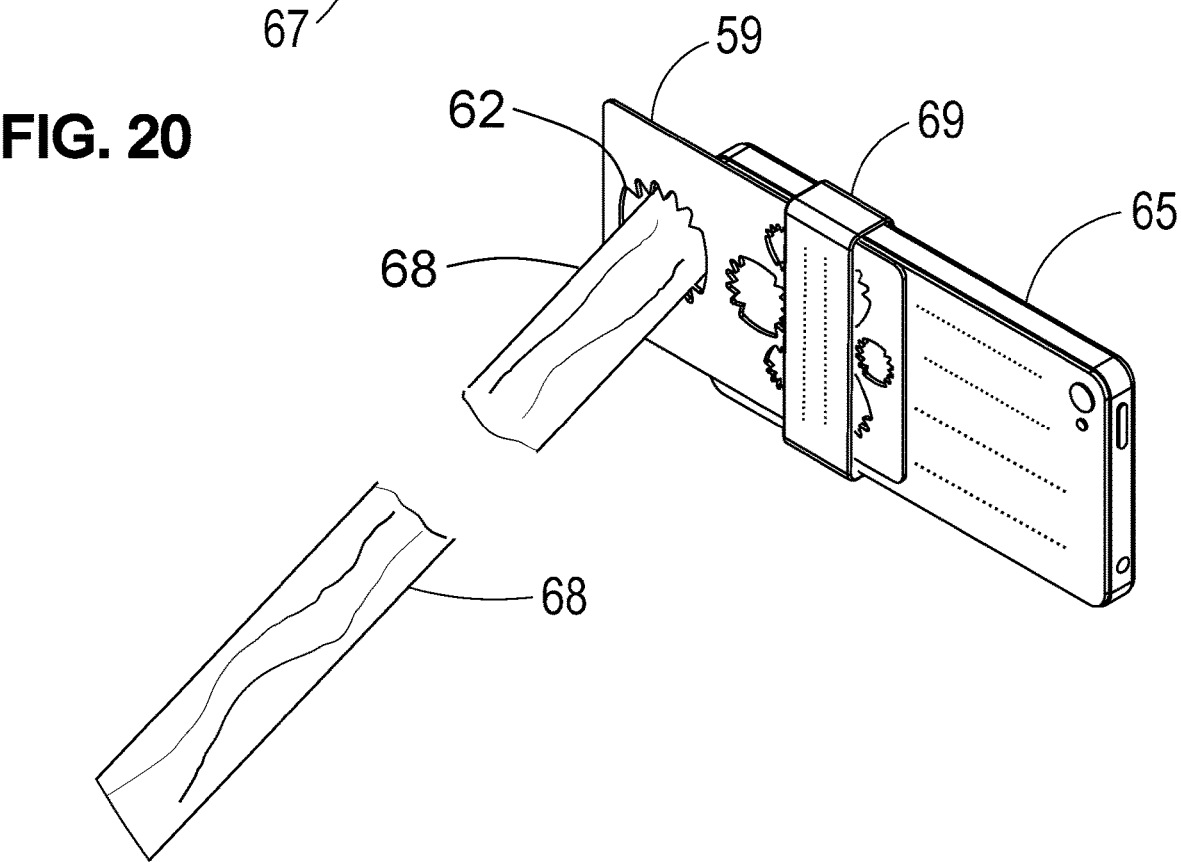
FIG. 21 shows an arrangement for making a selfie stick out of the card.

It should be understood that not only are the design options, functionality and application of the metal lashings plates of the present invention wide ranging, but the size of the metal lashing plate itself is very scalable. The potential combinations of bites, cutouts, holes, slot and tabs open up multiple potential usages even outside of outdoor pursuits. As an example of scalability FIG. 18 shows a metal lashing plate 59 that is credit card sized and incorporates three different sized bites 60, 61 & 62 and a single hole 63. As with metal lashing plate 10 previously discussed the two sets of three bites 60 & 61 can be used to form a tripod with natural members. Bites 60 used for a small tripod and bites 61 for a larger tripod, or even potentially mixed use based on the natural members available. FIG. 19 & FIG. 19A shows the alternate views of the use of such a portable tripod with a smartphone 65. In FIG. 19 & FIG. 19A we have processed natural members 64 shown as pencils, but they can be unprocessed natural members like sticks or twigs. The natural members 64 are engaged by the bites 60 in the metal lashing plate 59 so that the ends of the natural members 64 grip and support the smartphone 65 without any additional parts. The function of hole 63 of FIG. 18 is to allow the addition of standard camera mounting thread or smartphone holder 66 as shown in FIG. 20. The large bite 62 of the credit card sized metal lashing plate 58 allows it to function as a selfie stick, when used in conjunction with a natural member 68 and some means 69 like a wristband, elastic band, Velcro strap, or another way of securing a smartphone 65 as shown in FIG. 21.

Figure 22:
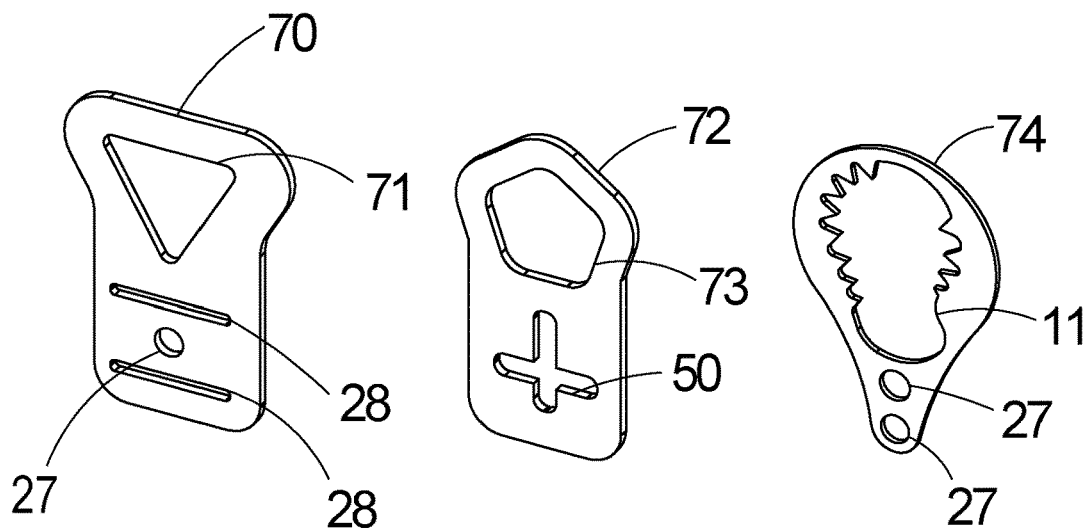
FIG. 22 shows some alternative bite arrangements and connection options.

The examples provided above have been selected to try and demonstrate the many potential embodiments and applications of the present invention, but are not intended to limit the scope of the present invention. The inventors have considered and contemplated a wide range of metal lashing plate embodiment's and FIG. 22 shows a few of the many combinations of bites and connection options possible that would fall within the scope of the present invention, but they do not limit the scope of the present invention, as the combinations and permutations of bites and connection options are unlimited. In addition, a wide range of bite designs themselves further increases the scope of the present invention. FIG. 22 shows a metal lashing plate 70 with a triangular bite 71, while metal lashing plate 72 shows a bite 73 in the form of a pentagon. bites of the present invention, using sharp edges for engaging a natural member, can be formed from any geometrical shape or custom designed shapes in addition to those shown herein as examples. Shapes and the associated sharp edges forming the bite can be designed to optimize the engagement of different natural member types, with regard to the hardness, cellular and fiber construction of the outer layer or layers, and dimensional variations in the natural member. One example of a typical custom designed bite 11 is shown in the metal bite embodiment 74 of FIG. 22 and was previously shown in FIG. 3 where three bites 11 are incorporated in the metal lashing plate 10.

Figure 23:
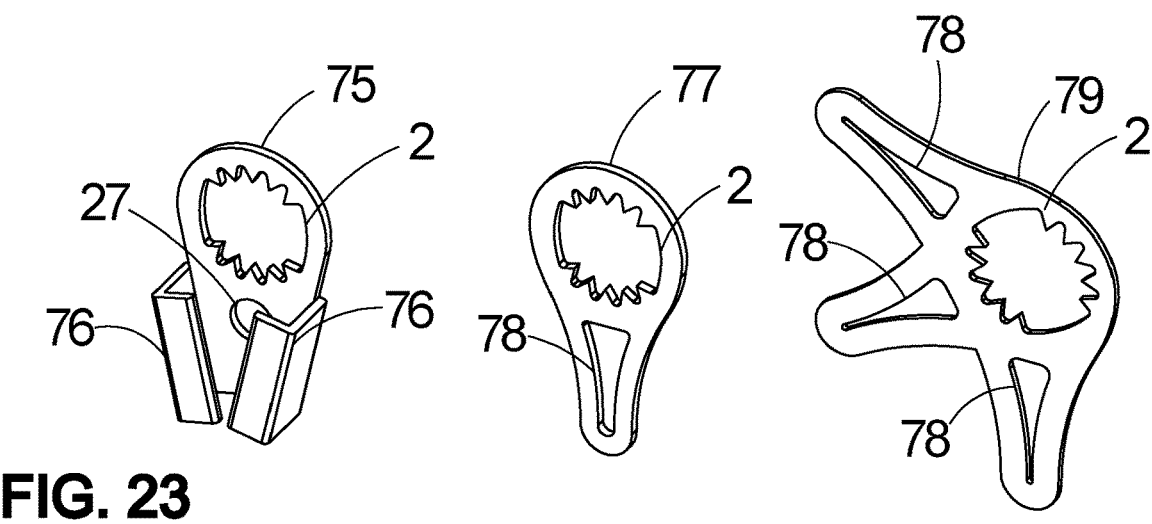
FIG. 23 shows some additional metal lashing plate connection options.

FIG. 22 also shows connection options 27 and 28 for metal lashing plate 70, connection option 50 for metal lashing plate 72 and two of the hole type connection options 27 on metal lashing plate 74. These connection options have been shown in other figures FIG. 9 & FIG. 15 previously and could have been shown here in FIG. 22 on anyone of the metal lashing plates 70, 72 or 74, or all three options 27, 28 & 50 could have been used on a single metal lashing plate, as could the keyhole 17 of FIG. 3. Obviously the connection options of metal lashing plates are not only interchangeable but can be varied and multiple as shown by some more examples in FIG. 23 which all make use of the example bite type 2. Metal lashing plate 75 shows a possible connection option with two bent over wings forming a wedge shape connection 76 and a single hole connection option 27. Application of the wedge shape will be apparent to those familiar in the art of mechanical rope connection devices used in boating, climbing and camping, as will the application of the following set of possible metal lashing plate embodiments of the present invention. Metal lashing plate 77 has a tapered slot 78 for cinching and securing rope or other cordage. Multiple tapered slots 78 are incorporated into the metal lashing plate 79 to further illustrate the possible multiple connection options as shown. It is obvious with all of the connection types show, plus others that those familiar with the art, that there is almost unlimited combinations and permutations of bites and connection options for metal lashing plates.

Figure 24:
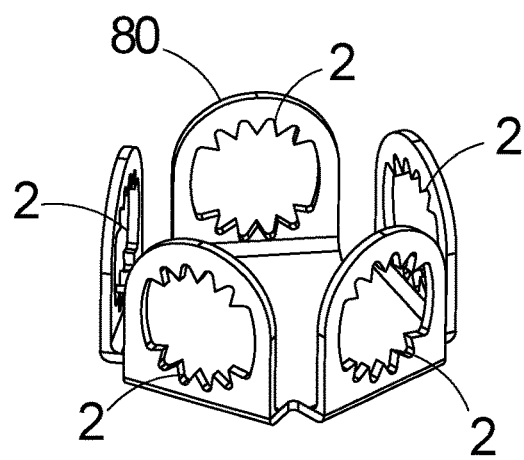
FIG. 24 shows a metal lashing plate for making a geodesic dome.

Multiple bites in a metal lashing plate have been shown within this disclosure of the present invention as in figures FIG. 3, FIG. 7, FIG. 10, FIG. 12, FIG. 14, FIG. 17 & FIG. 18. Metal lashing plate 80 of FIG. 24 shows another example of multiple bites on a single metal lashing plate, this time intended for use in the construction of a geodesic dome type structure, or it can be used to form a yurt type shelter. Metal lashing plate 80 is shown with five identical bites 2, but it can equally use different bite shapes, have more or fewer bites and other connection options to better suit a specific purpose.

Figure 25:
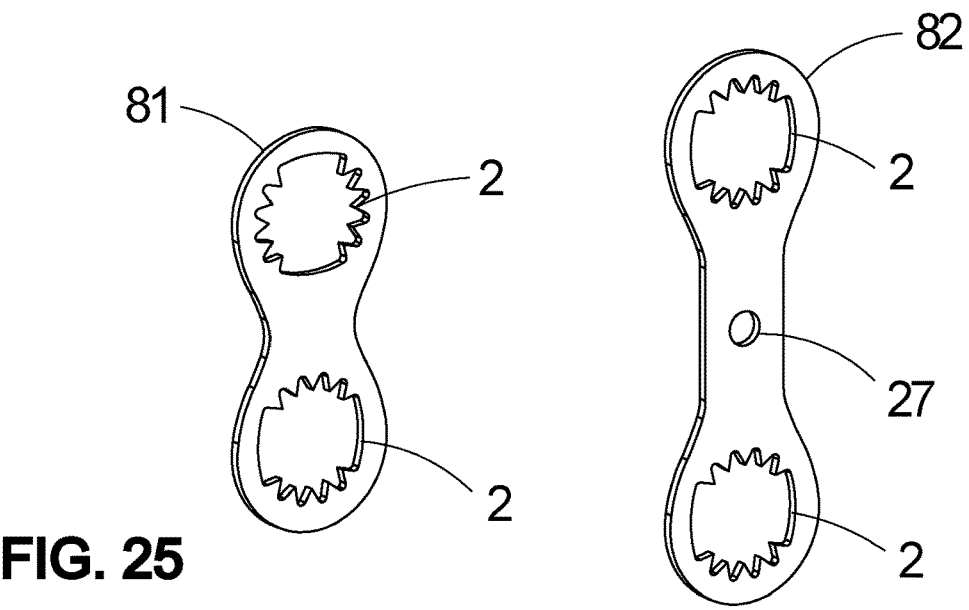
FIG. 25 shows metal lashing plates for cross linking natural members.
Figure 26:
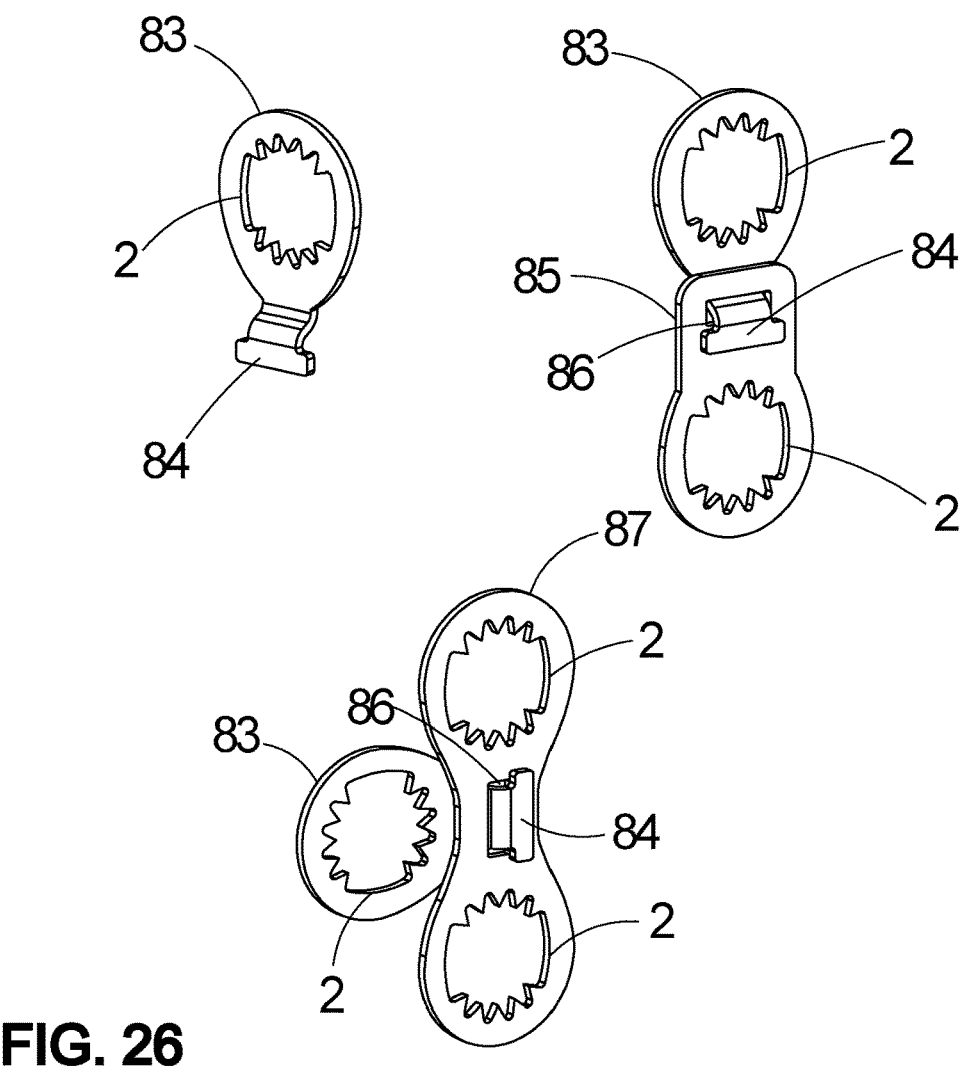
FIG. 26 shows one method of inter-linking metal lashing plates.

While it is envisioned by the inventors that the metal lashing plates of the present invention can be custom fabricated with single or multiple bites and various connection options for specific applications and usage, as discussed in the preceding paragraph, it is also an objective of the present invention that the metal lashing plates are versatile enough so as to minimize the necessity of custom designed metal lashing plates and provide a variety of inter-connection options with some of the possible options in FIG. 25 and FIG. 26 shown to help understand the envisioned interconnectivity of the metal lashing plates of the present invention.

Shown in FIG. 25 is a metal lashing plate 81 with two bites 2 that can be used to join two natural members together. The metal lashing plate 81 can also be used to connect, as in the way of a chain link, by overlapping bites on natural members to form a wall. Similarly, by overlapping the bites of metal lashing plates on the same natural member, additional connection features of a second or third metal lashing plate can be provided. The hole 27 in metal lashing plate 82 can be used to join, through the use of a pin, rivet, or standard nut and bolt, to another metal lashing plate with a similar connection facilitating hole 27. FIG. 26 shows metal lashing plate 83 with a standard male tab connector 84 which can interconnect with the female tab receptor slot 86 of metal lashing plates 85 and 87. These are just a few examples of how metal lashing plates can be linked or interconnected. It is not the intent of the present invention to limit the type and styles of inter-connection used between metal lashing plates to those shown or discussed herein, any fastening mechanism commonly found and used by those practicing the art of sheet metal fabrication can be incorporated into a metal lashing plate of the present invention.

Figure 27:
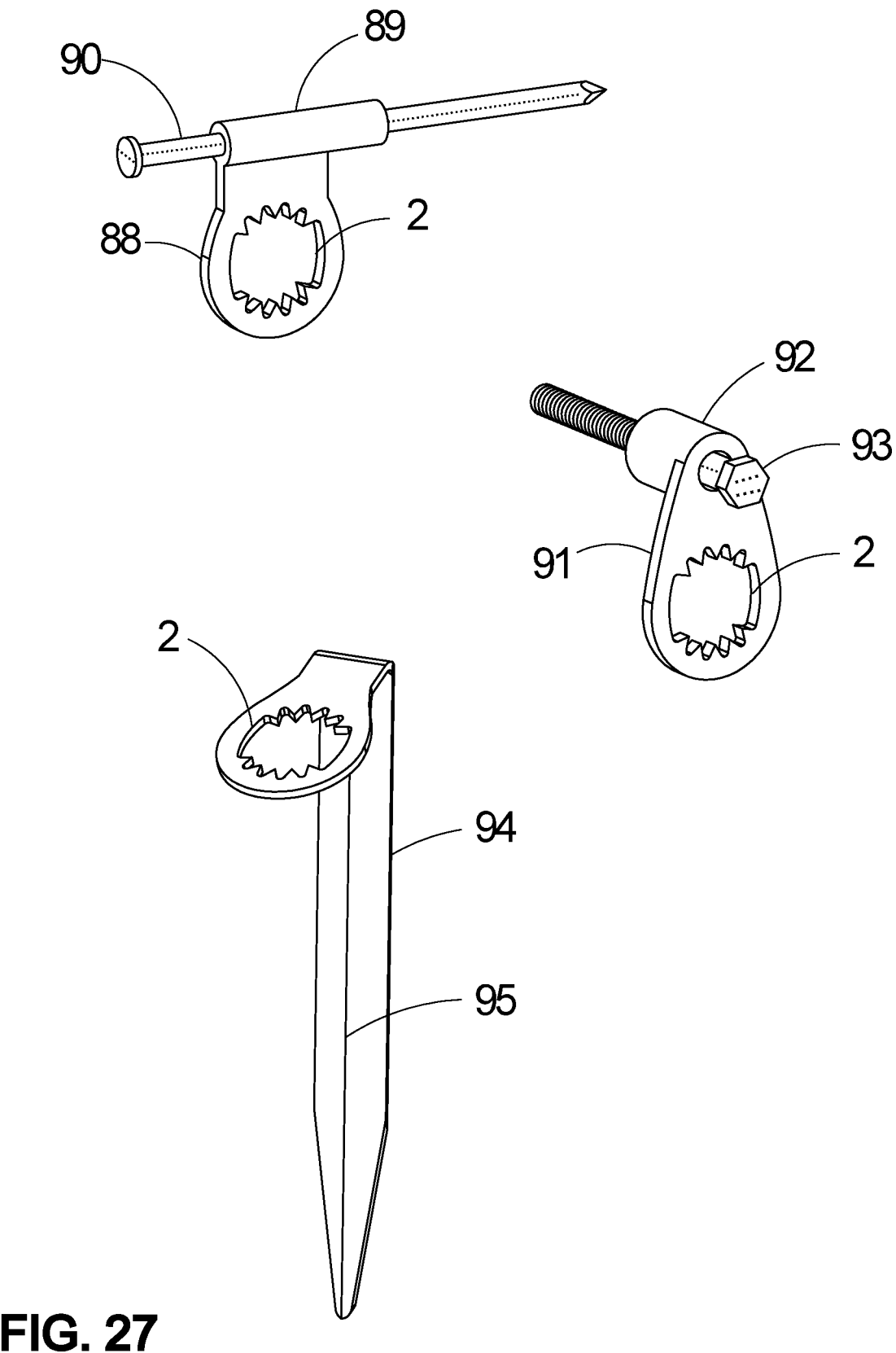
FIG. 27 shows some options for anchoring metal lashing to large trees, structures, and to the ground if needed.

While nails, screws and bolts are not generally suitable for connection of the natural members typical used in the construction of the types of tools and structure needed for outdoor pursuits and survival, there are still situations where a nail, screw or bold would be an appropriate anchor connection for a metal lashing plate. Such anchor connections can be useful for attaching natural members to a large tree, an existing structure, or even a rock. FIG. 27 shows how a nail 90 and a bolt 93 can be used to secure metal lashing plates 88 and 91 to a structure by ways of the incorporated tube standoff connections 89 and 92 respectively. At times, natural members will need to be attached to the ground. While this could be accomplished by sharpening the end of the natural member, there could be ground conditions when this is not possible. Metal lashing plate 94 is in the form of a ground peg, with a stiffening bend 95, that can be hammered into the hard earth and then a natural member can be attached using bite 2. Without having to show it, it should be obvious by now that the metal lashing 95 can have standard tent peg connections incorporated that would allow it to have dual application as a tent peg. Equally a tent peg or other existing device can be modified to add or incorporate a bite of the present invention and then fall within the scope of the present invention.

INDUSTRIAL APPLICABILITY

From the description and the drawings presented as example embodiment's of the present invention, along with the explanation of usage, it should be obvious to anyone skilled in the art how to produce and make use of the metal lashing plates disclosed herein. The intended use of the present invention is primarily described as a lashing replacement for the fabrication of tools and the construction of structures, from locally harvested natural members, to increasing the survival chances and comfort of people in outdoor survival situations. It should be obvious to anyone skilled in outdoor pursuit and activities, or those preparing for natural or man made disasters, the many and varied forms the present invention can encompass and the many and varied applications to which the present invention can be applied. The stated prime focus of the present invention does not in any way limit the use and scope of the present invention, as the inventors anticipate its use in a wide range of other applications. The present invention embodiment herein illustrate rather than limits the present invention and those skilled in the art will be able to design many alternative metal lashing plate embodiment without departing from the scope of the appended claims.

We claim:

1. A joint, comprising:
    a connector made from a first material, the connector comprising:
        one or more through holes perpendicular to a thinnest plane of said connector,
        a plurality of sharp edges formed around the inside of a rim of said through hole, wherein a base of said sharp edges join with the rest of said connector's body, and said sharp edges occupy any part of a space directly within, above and below said through hole's area as defined by an outside edge of said rim;
    one or more members made from a natural second material, wherein the first material has a hardness rating greater than the hardness rating of the second material;
    wherein a respective member is inserted into a respective through hole, said sharp edges upset and engage an outer layer of the member, fastening said member in place when a force is applied to said member relative to said connector.

2. The joint of claim 1, wherein said one or more members is or are essentially cylindrical.

3. The joint of claim 1, wherein said one or more members is a natural member selected from the group consisting of wood sticks, tree branches, saplings and small trees, logs, bamboo, and other canes.

4. The joint of claim 1, wherein said through holes can be all of one shape and size or of multiple different shapes and sizes.

5. The joint of claim 1, wherein said sharp edges take the form selected from a group consisting of geometric shapes, teeth, free form curves, and angles.

6. The joint of claim 1, wherein said through holes incorporate profile features along with said sharp edges to position said one or more members and promote engagement when a force is applied to said one or more members relative to said connector.

7. The joint of claim 1, wherein said connector is bent, formed or melded together to present said through holes in different planes or angles to said one or more members.

8. The joint of claim 1, wherein said connector is fabricated with pressed, corrugated, bent, folded and boss structures to increase strength, and holes to reduce the weight, while providing the required stiffness and flexibility.

9. The joint of claim 1, wherein said connector incorporates a single or a plurality of connection options selected from a group consisting of geometrically shaped holes and cutouts, tabs, punched, pressed, bent, and folded structures, wherein said connection options provide a means to attach flexible or solid connectors and fasteners for connection to other members, components, devices, parts, structures, or connectors.

10. The joint of claim 1, wherein said connector is made from sheet metal by common production methodologies selected from the group consisting of laser cutting, water cutting, plasma cutting, electrical discharge machining, stamping, milling, broaching, pressing, punching, bending, folding, forging, welding, drilling, sawing, and grinding.

11. The joint of claim 1, wherein said connector is made from one or more materials selected from the group consisting of epoxy resins, glass, carbon fiber, metal, minerals, plastics, polymers, stone, and metamaterials.

12. The joint of claim 1, wherein said connector is made in part or fully by an additive material process, a sintering process, a molding process, a casting process, a broaching process, an electrical discharge machining process, a milling process, or by hand fabrication.

* * * * *